United States Patent
Yang et al.

(10) Patent No.: US 11,234,203 B2
(45) Date of Patent: Jan. 25, 2022

(54) DUAL-REGISTERED TERMINAL DEVICE WIRELESS COMMUNICATION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/763,422

(22) PCT Filed: Nov. 24, 2017

(86) PCT No.: PCT/CN2017/112945
§ 371 (c)(1),
(2) Date: May 12, 2020

(87) PCT Pub. No.: WO2019/100344
PCT Pub. Date: May 31, 2019

(65) Prior Publication Data
US 2021/0076345 A1 Mar. 11, 2021

(51) Int. Cl.
*H04W 60/00* (2009.01)
*H04W 72/04* (2009.01)
*H04W 88/06* (2009.01)

(52) U.S. Cl.
CPC ......... *H04W 60/005* (2013.01); *H04W 72/04* (2013.01); *H04W 88/06* (2013.01)

(58) Field of Classification Search
CPC .... H04W 60/005; H04W 72/04; H04W 88/06
See application file for complete search history.

(56) References Cited

U.S. PATENT DOCUMENTS

2013/0294417 A1* 11/2013 Yerrabommanahalli ...................
H04W 48/18
370/335
2015/0071088 A1* 3/2015 Gottimukkala ....... H04W 24/02
370/252

(Continued)

FOREIGN PATENT DOCUMENTS

| CN | 103987124 A | 8/2014 |
| CN | 105794141 A | 7/2016 |

(Continued)

OTHER PUBLICATIONS

International Search Report for PCT/CN2017/112945 dated Jul. 16, 2018.

(Continued)

*Primary Examiner* — Minjung Kim
(74) *Attorney, Agent, or Firm* — Young Basile Hanlon & MacFarlane, P.C.

(57) ABSTRACT

Provided by implementations of the present disclosure are a dual-registered terminal device wireless communication method, a network device and a terminal device. The method comprises: the terminal device being registered in both a first network and a second network; the first network device sending indication information to the second network device, the indication information being used to indicate that the first network device is sending a downlink message to the terminal device or is receiving an uplink message from the terminal device, the first network device being a network device under the first network, and the second network device being a network device under the second network.

17 Claims, 5 Drawing Sheets

(56) References Cited

U.S. PATENT DOCUMENTS

2015/0156671 A1* 6/2015 Kuchibhotla ......... H04L 5/0053
                                                           370/330
2018/0007583 A1* 1/2018 Hong ................ H04W 72/0446
2018/0020464 A1* 1/2018 Liang .................... H04W 76/28

FOREIGN PATENT DOCUMENTS

CN        106165488 A       11/2016
WO        2017146780 A1      8/2017
WO        2017166390 A1     10/2017
WO     WO-2017166390 A1 *   10/2017   ............ H04W 88/06

OTHER PUBLICATIONS

3GPP TSG-RAN WG2 #100 Tdoc ; Reno, Nevada, USA, Nov. 27-Dec. 1, 2017; R2-1713348.
3GPP TSG-RAN WG2 Meeting #100; Reno, USA, Nov. 27-Dec. 1, 2017 revision of R2-1710927; R2-1712995.
3GPP TSG-RAN WG2 Meeting #100; Reno, Nevada, USA, Nov. 27-Dec. 1, 2017 (revision of R2-1710637) R2-1712688.
3GPP TSG-RAN WG2 Meeting #100; Reno, USA, Nov. 27-Dec. 1, 2017; R2-1713878.
Extended European Search Report for EP Application 17932970.1 dated Sep. 9, 2020.

* cited by examiner

200

A first network device transmits indication information to a second network device, the indication information is used for indicating the first network device to transmit a downlink message to the terminal device or receive an uplink message from the terminal device, the first network device is a network device under the first network, and the second network device is a network device under the second network.  ~210

A second network receives indication information transmitted by a first network device, the indication information is used for indicating the first network device to transmit a downlink message to the terminal device or receive an uplink message from the terminal device, the first network device is a network device under the first network, and the second network device is a network device under the second network  ~310

The second network device configures a first time period according to the indication information, wherein the second network device stops scheduling for the terminal device within the first time period  ~320

DUAL-REGISTERED TERMINAL DEVICE WIRELESS COMMUNICATION METHOD, NETWORK DEVICE AND TERMINAL DEVICE

CROSS-REFERENCE TO RELATED APPLICATION(S)

This application is a 371 application of International Application No. PCT/CN2017/112945, filed on Nov. 24, 2017, the entire disclosure of which is hereby incorporated by reference.

TECHNICAL FIELD

The present disclosure relates to the field of communication, and more particularly to a method for wireless communication of a dual-registered terminal device, a network device, and a terminal device.

BACKGROUND

In 5-Generation (5G) mobile communication technology New Radio (NR) communication, a terminal device may support Receive (Rx) or Transmission (Tx) in two networks (Long Term Evolution (LTE) and NR) simultaneously, and the terminal device is registered in both networks. For a terminal device that only supports single Transmission and single Receive (1Rx/1Tx), a problem that data cannot be received in another registered network when uplink transmission or downlink reception is performed in one registered network is an urgent problem to be solved.

SUMMARY

Implementations of the present disclosure provide a method for wireless communication of a dual-registered terminal device, a network device, and a terminal device. The terminal device avoids receiving a downlink message transmitted by a second network device when receiving a downlink messages transmitted by a first network device or when transmitting an uplink message to the first network device.

In a first aspect, an implementation of the present disclosure provides a method for wireless communication of a dual-registered terminal device, wherein the terminal device is registered in a first network and a second network simultaneously. The method includes: transmitting, by a first network device, indication information to a second network device, the indication information is used for indicating the first network device to transmit a downlink message to the terminal device or receive an uplink message from the terminal device, the first network device is a network device under the first network, and the second network device is a network device under the second network.

Optionally, in one implementation of the first aspect, the indication information is further used for indicating that the second network device being able to page the terminal device within a first time period.

Optionally, in one implementation of the first aspect, the method further includes: receiving, by the first network device, a request message transmitted by the terminal device, and the request message is used for requesting the first network device to configure a second time period for the second network, wherein the terminal device receives the downlink message transmitted by the second network device and/or transmits the uplink message to the second network device within the second time period, or the second network device avoids paging the terminal device within the second time period.

Optionally, in one implementation of the first aspect, the method further includes: transmitting, by the first network device, configuration information to the terminal device, wherein, the configuration information is used for indicating the terminal device to receive the downlink message transmitted by the second network device or transmitting the uplink message to the second network device within a third time period, or the configuration information is used for indicating the terminal device to receive the downlink message transmitted by the second network device or transmit the uplink message to the second network device after an end of a fourth time period.

Optionally, in one implementation of the first aspect, the downlink message is a paging message, and the uplink message is at least one of uplink data, a paging response, and location updating information.

Optionally, in one implementation of the first aspect, the terminal device only supports uplink transmission or downlink reception in a single network.

Optionally, in one implementation of the first aspect, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

In a second aspect, an implementation of the present disclosure provides a method for wireless communication of a dual-registered terminal device, wherein the terminal device is registered in both a first network and a second network. The method includes: receiving, by a second network device, indication information transmitted by a first network device, the indication information is used for indicating the first network device to transmit a downlink message to or receive an uplink message from the terminal device, the first network device is a network device under the first network and the second network device is a network device under the second network; and configuring, by the second network device, a first time period according to the indication information, wherein the second network device stops scheduling for the terminal device within a first time period.

Optionally, in one implementation of the second aspect, the indication information is further used for indicating the second network device to page the terminal device within a second time period; and configuring, by the second network device, the first time period according to the indication information, includes: configuring, by the second network device, the first time period according to the indication information, and the second time period is after an end of the first time period.

Optionally, in one implementation of the second aspect, the method further includes: transmitting, by the second network device, first configuration information to the terminal device, and the first configuration information is used for indicating the terminal device to receive the downlink message transmitted by the first network device or transmit the uplink message to the first network device within a third time period.

Optionally, in one implementation of the second aspect, the method further includes: transmitting, by the second network device, second configuration information to the terminal device, the second configuration information is used for indicating the terminal device to receive the downlink message transmitted by the second network device or transmit the uplink message to the second network device within a fourth time period, or the second configuration information is used for indicating the terminal device to receive the downlink message transmitted by the second network device or transmit the uplink message to the second network device after an end of a fifth time period.

Optionally, in one implementation of the second aspect, the downlink message is a paging message, and the uplink message is at least one of uplink data, a paging response, and location update information.

Optionally, in one implementation of the second aspect, the terminal device only supports uplink transmission or downlink reception in a single network.

Optionally, in one implementation of the second aspect, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

In a third aspect, an implementation of the present disclosure provides a method for wireless communication of a dual-registered terminal device, wherein the terminal device is registered in both a first network and a second network.

The method includes: receiving, by the terminal device, first configuration information transmitted by a first device, wherein the first configuration information is used for indicating the terminal device to receive a downlink message transmitted by a first network device or transmit an uplink message to the first network device within a first time period, and the first network device is a network device under the first network; and receiving, by the terminal device, the downlink message transmitted by the first network device or transmitting the uplink message to the first network device according to the first configuration information.

Optionally, in one implementation of the third aspect, the method further includes: receiving, by the terminal device, second configuration information transmitted by the first device, the second configuration information is used for indicating to receive the downlink message transmitted by the second network device or transmit the uplink message to the second network device within a second time period, or the second configuration information is used for indicating to receive the downlink message transmitted by the second network device or transmit the uplink message to the second network device after an end of a third time period; and receiving, by the terminal device, the downlink message transmitted by the first network device or transmitting the uplink message to the first network device according to the first configuration information, includes: receiving, by the terminal device, the downlink message transmitted by the first network device or transmitting the uplink message to the first network device, or receiving the downlink message transmitted by the second network device or transmitting the uplink message to the second network device, according to the first configuration information and/or the second configuration information.

Optionally, in one implementation of the third aspect, before the terminal device receives the first configuration information transmitted by the first device, the method further includes: transmitting, by the terminal device, a request message to the first device, the request message is used for requesting the first device to configure a fourth time period for the second network, wherein the terminal device receives the downlink message transmitted by the second network device and/or transmits the uplink message to the second network device within the fourth time period, or the second network device avoids paging the terminal device within the fourth time period.

Optionally, in one implementation of the third aspect, before the terminal device receives the first configuration information transmitted by the first device, the method further includes: receiving, by the terminal device, the downlink message transmitted by the first network device or transmitting the uplink message to the first network device.

Optionally, in one implementation of the third aspect, the downlink message is a paging message, and the uplink message is at least one of uplink data, a paging response, and location update information.

Optionally, in one implementation of the third aspect, the first device is the first network device or the second network device.

Optionally, in one implementation of the third aspect, the terminal device only supports uplink transmission or downlink reception in a single network.

Optionally, in one implementation of the third aspect, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

In a fourth aspect, an implementation of the present disclosure provides a network device that may execute modules or units of the method in the first aspect or any optional implementation of the first aspect.

In a fifth aspect, an implementation of the present disclosure provides a network device that may execute modules or units of the method in the second aspect or any optional implementation of the second aspect.

In a sixth aspect, an implementation of the present disclosure provides a terminal device that may execute modules or units of the method in the third aspect or any optional implementation of the third aspect.

In a seventh aspect, a network device is provided, and the network device includes a processor, a memory, and a communication interface. The processor is connected with the memory and the communication interface. The memory is used for storing instructions, and the processor is used for executing the instructions, and the communication interface is used for communicating with other network elements under control of the processor. When the processor executes the instructions stored in the memory, the execution causes the processor to execute the method in the first aspect or any possible implementation of the first aspect.

In an eighth aspect, a network device is provided, and the device includes a processor, a memory, and a communication interface. The processor is connected with the memory and the communication interface. The memory is used for storing instructions, and the processor is used for executing the instructions, and the communication interface is used for communicating with other network elements under control of the processor. When the processor executes the instructions stored in the memory, the execution causes the processor to execute the method in the second aspect or any possible implementation of the second aspect.

In a ninth aspect, a terminal device is provided, and the terminal device includes a processor, a memory, and a communication interface. The processor is connected with the memory and the communication interface. The memory is used for storing instructions, and the processor is used for executing the instructions, and the communication interface is used for communicating with other network elements under control of the processor. When the processor executes the instructions stored in the memory, the execution causes the processor to execute the method in the third aspect or any possible implementation of the third aspect.

In a tenth aspect, a computer storage medium is provided, and the computer storage medium stores program codes for instructing a computer to execute instructions of the methods described in the above various aspects.

In an eleventh aspect, a computer program product including instructions is provided, when executed on a computer, the instructions cause the computer to perform the methods described in the above aspects.

BRIEF DESCRIPTION OF DRAWINGS

FIG. 2 is a schematic flow chart of a method for wireless communication of a dual-registered terminal device according to an implementation of the present disclosure.

FIG. 3 is a schematic flow chart of another method for wireless communication of a dual-registered terminal device according to an implementation of the present disclosure.

DETAILED DESCRIPTION

Technical solutions in implementations of the present disclosure will be clearly and completely described below with reference to the drawings in the implementations of the present disclosure.

The technical solutions of implementations of the present disclosure may be applied to various communication systems, such as a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G NR communication system.

A terminal device in an implementation of the present disclosure may be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an on-board device, a wearable device, a terminal device in a 5G network, or a terminal device in a Future Evolved Public Land Mobile Network (PLMN), etc., and implementations of the present disclosure are not limited thereto.

Various implementations are described herein in combination with network devices in the present disclosure. A network device in an implementation of the present disclosure may be a device for communicating with a terminal device. The access network device may be an Evolutional NodeB station (eNB or eNodeB) in a LTE system, or a wireless controller in a Cloud Radio Access Network (CRAN) scenario. Or, the access network device may be a relay station, an access point, an on-board device, a wearable device, a Next Generation Evolutional NodeB (NG-eNB), an access network device in a 5G network (e.g., gNB) or an access network device in a future evolved Public Land Mobile Network (PLMN) network, etc., and implementations of the present disclosure are not limited thereto.

Figure 1:
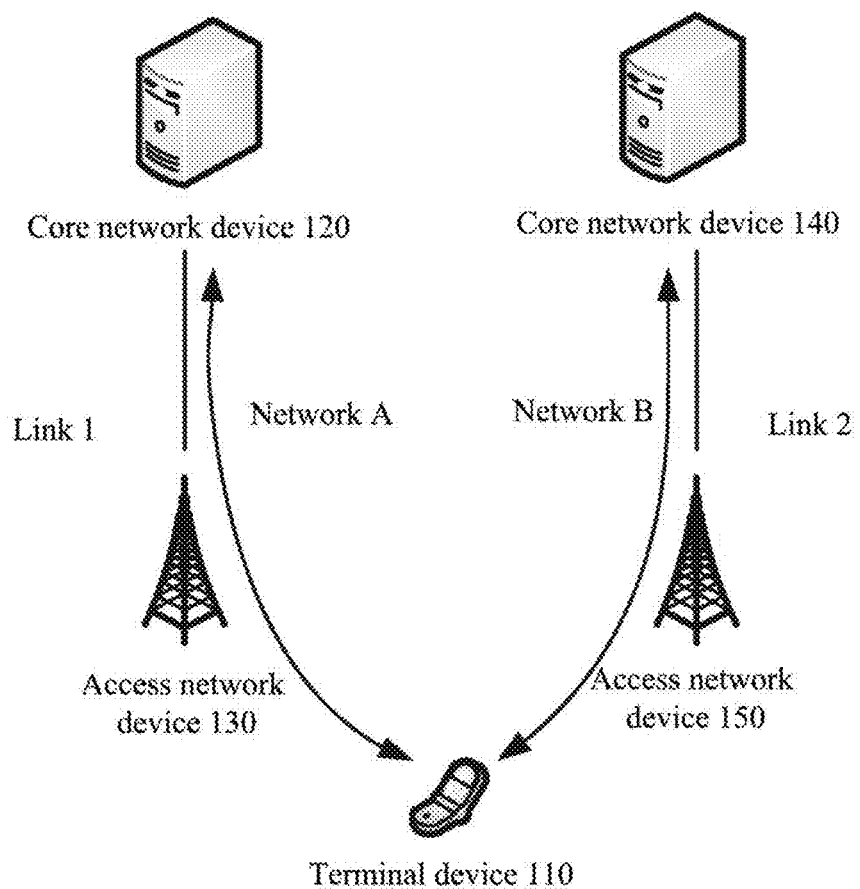
FIG. 1 is a schematic diagram of an application scenario according to an implementation of the present disclosure.

FIG. 1 is a schematic diagram of an application scenario of an implementation of the present disclosure. As shown in FIG. 1, a terminal device 110 in a wireless communication system 100 registers a network A via link 1 and registers a network B via link 2. The terminal device 110 is communicatively connected with a core network device 120 and an access network device 130 via link 1, and the terminal device 110 is connected with a core network device 140 and an access network device 150 via link 2. The core network device 120 is communicatively connected with the access network device 130, and the core network device 140 is communicatively connected with the access network device 150. The core network device 120 and the core network device 140 simultaneously serve the terminal device 110, which is not limited by implementations of the present disclosure.

Optionally, the wireless communication system 100 may further include other network entities, which is not limited in implementations of the present disclosure.

Optionally, network A is a LTE network and network B is a NR network, or, network A is a NR network and network B is a LTE network, or, network A is a NR network and network B is a NR network, or, network A is a LTE network and network B is a LTE network.

Optionally, a core network device under a LTE network is a Mobility Management Entity (MME), and an access network device is an eNB; a core network device under a NR network is an Access and Mobility Management Function (AMF), and an access network device is a gNB.

In addition, various aspects or features of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), a disk (such as a compact disc (CD), a digital versatile disc (Digital Versatile Disc, DVD)), smart cards and flash storage devices (such as Erasable Programmable Read-Only Storage (EPROM), cards, sticks or key drives). In addition, various storage mediums described herein may represent one or more devices and/or other machine-readable mediums for storing information. The term "machine-readable medium" may include, but is not limited to, various media capable of storing, containing, and/or carrying instructions and/or data.

It should be understood that the terms "system" and "network" are often used interchangeably in this document.

The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 2 is a schematic flow chart of a method 200 for wireless communication of a dual-registered terminal device according to an implementation of the present disclosure. As shown in FIG. 2, the method 200 may be performed by a first network device, which may be a core network device or an access network device as shown in FIG. 1, and the terminal device is registered in both a first network and a second network, the method 200 includes the following contents.

In 210, the first network device transmits indication information to a second network device, the indication information is used for indicating the first network device to transmit a downlink message to the terminal device or receive an uplink message from the terminal device, the first network device is a network device under the first network, and the second network device is a network device under the second network.

Optionally, the terminal device is registered in the first network and the second network simultaneously, then the first network device under the first network may negotiate with the second network device under the second network to determine a time point to transmit the downlink message to the terminal device or to receive the uplink message transmitted by the terminal device.

Optionally, the downlink message is a paging message, and the uplink message is at least one of uplink data, a paging response, and location update information.

Optionally, the terminal device only supports uplink transmission or downlink reception in a single network.

For example, the terminal device only supports single Transmission and single Receive (1Rx/1Tx).

Optionally, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

Optionally, the first network device may be a core network device or an access network device. For example, if the first network is a LTE network, the first network device may be a MME or an eNB.

Optionally, the second network device may be a core network device or an access network device. For example, if the second network is a NR network, the second network device may be an AMF or a gNB.

Optionally, the first network device or the second network device may configure different time periods in a Discontinuous Reception (DRX) manner, so that a terminal may smoothly transmit an uplink message or receive a downlink message.

Optionally, the terminal device may receive the downlink message transmitted by the first network device or the second network device at different time periods based on different time periods configured by the DRX, or transmit the uplink message to the first network device or the second network device.

Optionally, the indication information is further used for indicating that the second network device is able to page the terminal device within the first time period.

Optionally, the terminal device may actively request the first network device to configure a time period for the terminal device itself to transmit and receive a message in the second network.

Optionally, a duration of the first time period is greater than or equal to a duration of the first network device transmitting the downlink message to the terminal device or receiving the uplink message from the terminal device.

Optionally, the method 200 further includes: the first network device receives a request message transmitted by the terminal device, and the request message is used for requesting the first network device to configure a second time period for the second network, wherein the terminal device receives the downlink message transmitted by the second network device and/or transmits the uplink message to the second network device within the second time period, or the second network device avoids paging the terminal device within the second time period.

Optionally, if the first network device configures the second network device to avoid paging the terminal device within the second time period, it may be that there is an uplink/downlink message interaction between the first network device and the terminal device within the second time period.

Optionally, if the first network device configures the terminal device to receive the downlink message transmitted by the second network device and/or transmit the uplink message to the second network device within the second time period, it may be that there is no uplink/downlink message interaction between the first network device and the terminal device within the second time period.

Optionally, the method 200 further includes: the first network device transmits configuration information to the terminal device, the configuration information is used for indicating the terminal device to receive the downlink message transmitted by the second network device or transmit the uplink message to the second network device within a third time period, or the configuration information is used for indicating the terminal device to receive the downlink message transmitted by the second network device or transmit the uplink message to the second network device after an end of a fourth time period.

Optionally, within the third time period, there is no uplink/downlink message interaction between the first network device within the second period and the terminal device.

Optionally, within the fourth time period, there is an uplink/downlink message interaction between the first network device within the second period and the terminal device.

Therefore, in the method for wireless communication of a dual-registered terminal device according to an implementation of the present disclosure, the first network device transmits the indication information to the second network device, so that when the first network device transmits the downlink message to the terminal device or receives the uplink message from the terminal device, the second network device stops scheduling for the terminal device, and further, the terminal device may reasonably transmit and receive a message.

FIG. 3 is a schematic flow chart of a method 300 for wireless communication of a dual-registered terminal device according to an implementation of the present disclosure. As shown in FIG. 3, the method 300 may be performed by a second network device, which may be a core network device or an access network device as shown in FIG. 1, and the terminal device is registered in both a first network and a second network. The method 300 includes the following contents.

In 310, a second network device receives indication information transmitted by a first network device, the indication information is used for indicating the first network device to transmit a downlink message to the terminal device or receive an uplink message from the terminal device, the first network device is a network device under the first network, and the second network device is a network device under the second network.

In 320, the second network device configures a first time period according to the indication information, wherein the second network device stops scheduling for the terminal device within the first time period.

Optionally, the indication information is further used for indicating the second network device to page the terminal device within a second time period.

The second network device configures the first time period according to the indication information, including: the second network device configures the first time period according to the indication information, and the second time period is after an end of the first time period.

Optionally, the method further includes: the second network device transmits first configuration information to the terminal device, and the first configuration information is used for indicating the terminal device to receive the downlink message transmitted by the first network device or transmit the uplink message to the first network device within a third time period.

Optionally, the method further includes: the second network device transmits second configuration information to the terminal device, the second configuration information is used for indicating the terminal device to receive the downlink message transmitted by the second network device or transmit the uplink message to the second network device within a fourth time period, or the second configuration information is used for indicating the terminal device to receive the downlink message transmitted by the second network device or transmit the uplink message to the second network device after an end of a fifth time period.

Optionally, the downlink message is a paging message, and the uplink message is at least one of uplink data, a paging response, and location update information.

Optionally, the terminal device only supports uplink transmission or downlink reception in a single network.

Optionally, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

It should be understood that the acts in the method 300 for wireless communication of a dual-registered terminal device may refer to the description of the corresponding acts in the method 200 for wireless communication of a dual-registered terminal device, and will not be described in detail herein for the sake of brevity.

Therefore, in the method of wireless communication of a dual-registered terminal device according to an implementation of the present disclosure, the second network device receives the indication information transmitted by the first network device, so that when the first network device transmits the downlink message to the terminal device or receives the uplink message from the terminal device, the second network device stops scheduling for the terminal device, and further, the terminal device may reasonably transmit and receive a message.

Figure 4:
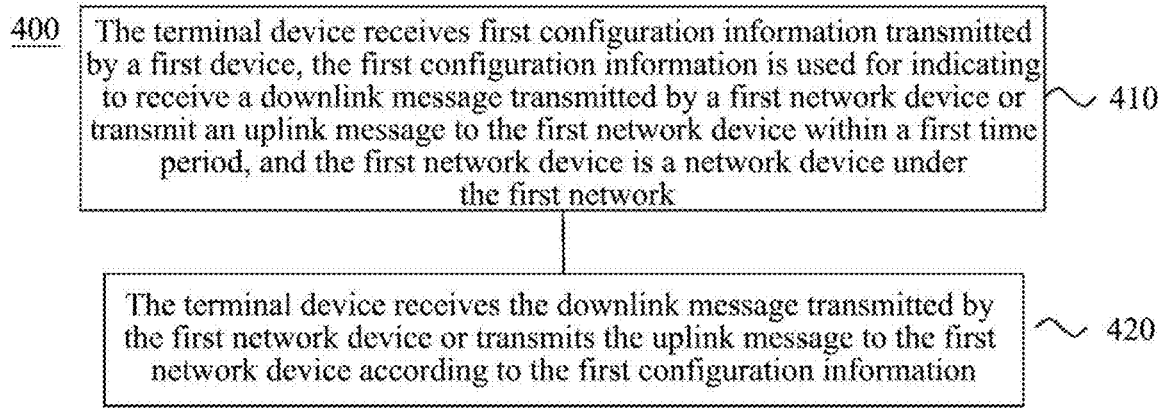
FIG. 4 is a schematic flow chart of yet another method for wireless communication of a dual-registered terminal device according to an implementation of the present disclosure.

FIG. 4 is a schematic flow chart of a method 400 for wireless communication of a dual-registered terminal device according to an implementation of the present disclosure. As shown in FIG. 4, the method 400 may be executed by a terminal device, which may be a terminal device as shown in FIG. 1, and the terminal device is registered in both a first network and a second network simultaneously. The method 400 includes the following contents.

In 410, the terminal device receives first configuration information transmitted by a first device, the first configuration information is used for indicating to receive a downlink message transmitted by a first network device or transmit an uplink message to the first network device within a first time period, and the first network device is a network device under the first network.

In 420, the terminal device receives the downlink message transmitted by the first network device or transmits the uplink message to the first network device according to the first configuration information.

Optionally, the method further includes: the terminal device receives second configuration information transmitted by the first device, the second configuration information is used for indicating the terminal device to receive the downlink message transmitted by the second network device or transmit the uplink message to the second network device within a second time period, or the second configuration information is used for indicating the terminal device to receive the downlink message transmitted by the second network device or transmit the uplink message to the second network device after an end of a third time period.

The terminal device receives the downlink message transmitted by the first network device or transmits the uplink message to the first network device according to the first configuration information, including: the terminal device receives the downlink message transmitted by the first network device or transmits the uplink message to the first network device, or the terminal device receives the downlink message transmitted by the second network device or transmits the uplink message to the second network device, according to the first configuration information and/or the second configuration information.

Optionally, before the terminal device receives the first configuration information transmitted by the first device, the method further includes: the terminal device transmits a request message to the first device, the request message is used for requesting the first device to configure a fourth time period for the second network, wherein the terminal device receives the downlink message transmitted by the second network device and/or transmits the uplink message to the second network device within the fourth time period, or the second network device avoids paging the terminal device within the fourth time period.

Optionally, before the terminal device receives the first configuration information transmitted by the first device, the method further includes: the terminal device receives the downlink message transmitted by the first network device or transmits the uplink message to the first network device.

Optionally, the downlink message is a paging message, and the uplink message is at least one of uplink data, a paging response, and location update information.

Optionally, the first device is the first network device or the second network device.

Optionally, the terminal device only supports uplink transmission or downlink reception in a single network.

Optionally, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

It should be understood that the acts in the method 400 for wireless communication of dual-registered terminal device may refer to description of the corresponding acts in the method 200 for wireless communication of dual-registered terminal device, which will not be repeated here for the sake of brevity.

Therefore, in the method for wireless communication of a dual-registered terminal device according to an implementation of the present disclosure, the terminal device receives the configuration information transmitted by the first device, so that the terminal device may reasonably transmit and receive a message according to the configuration information.

Figure 5:
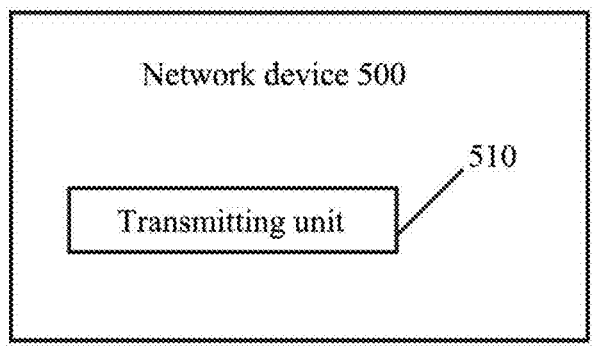
FIG. 5 is a schematic block diagram of a network device according to an implementation of the present disclosure.

FIG. 5 is a schematic block diagram of a network device 500 according to an implementation of the present disclosure. As shown in FIG. 5, the network device 500 communicates with a terminal device registered in both a first network and a second network. The network device 500 includes a transmitting unit 510.

The transmitting unit 510 is configured to transmit indication information to a second network device, the indication information is used for indicating the first network device to transmit a downlink message to the terminal device or receive an uplink message from the terminal device, the first network device is a network device under the first network and the second network device is a network device under the second network.

Optionally, the indication information is further used for indicating that the second network device is able to page the terminal device within a first time period.

Optionally, the transmitting unit 510 is further configured to receive a request message transmitted by the terminal device, and the request message is used for requesting the first network device to configure a second time period for the second network, wherein the terminal device receives the downlink message transmitted by the second network device and/or transmits the uplink message to the second network device within the second time period, or the second network device avoids paging the terminal device within the second time period.

Optionally, the transmitting unit 510 is further configured to transmit configuration information to the terminal device, the configuration information is used for indicating the terminal device to receive the downlink message transmitted by the second network device or transmit the uplink message to the second network device within a third time period, or the configuration information is used for indicating the terminal device to receive the downlink message transmitted by the second network device or transmit the uplink message to the second network device after an end of a fourth time period.

Optionally, the downlink message is a paging message, and the uplink message is at least one of uplink data, a paging response, and location update information.

Optionally, the terminal device only supports uplink transmission or downlink reception in a single network.

Optionally, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

It should be understood that the above-mentioned and other operations and/or functions of various modules in the network device 500 according to the implementation of the present disclosure are respectively to realize the corresponding processes in the method 200 in FIG. 2, and will not be repeated here for the sake of brevity.

Figure 6:
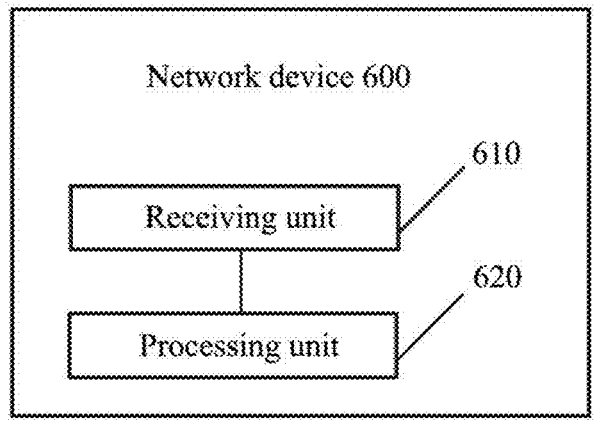
FIG. 6 is a schematic block diagram of another network device according to an implementation of the present disclosure.

FIG. 6 is a schematic block diagram of a network device 600 according to an implementation of the present disclosure. As shown in FIG. 6, the network device 600 communicates with a terminal device which is registered in both a first network and a second network. The network device 600 includes a receiving unit 610 and a processing unit 620.

The receiving unit 610 is configured to receive indication information transmitted by a first network device, the indication information is used for indicating the first network device to transmit a downlink message to the terminal device or receive an uplink message from the terminal device, the first network device is a network device under the first network and the second network device is a network device under the second network;

The processing unit 620 is configured to configure a first time period according to the indication information, wherein the second network device stops scheduling for the terminal device within the first time period.

Optionally, the indication information is further used for indicating the second network device to page the terminal device within a second time period.

The processing unit 620 is specifically configured to: configure the first time period according to the indication information, and the second time period is after an end of the first time period.

Optionally, the network device further includes a transmitting unit 630.

The transmitting unit 630 is configured to transmit first configuration information to the terminal device, and the first configuration information is used for indicating the terminal device to receive the downlink message transmitted by the first network device or transmit the uplink message to the first network device within a third time period.

Optionally, the transmitting unit 630 is further configured to transmit second configuration information to the terminal device, wherein the second configuration information is used for indicating the terminal device to receive the downlink message transmitted by the second network device or transmit the uplink message to the second network device within a fourth time period, or the second configuration information is used for indicating the terminal device to receive the downlink message transmitted by the second network device or transmit the uplink message to the second network device after an end of a fifth time period.

Optionally, the downlink message is a paging message, and the uplink message is at least one of uplink data, a paging response, and location update information.

Optionally, the terminal device only supports uplink transmission or downlink reception in a single network.

Optionally, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

It should be understood that the above-mentioned and other operations and/or functions of various modules in the device 600 according to an implementation of the present disclosure are respectively to realize the corresponding processes in the method 300 in FIG. 3, and will not be repeated here for the sake of brevity.

Figure 7:
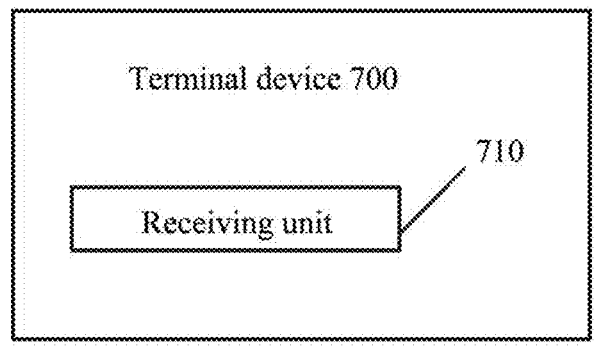
FIG. 7 is a schematic block diagram of a terminal device according to an implementation of the present disclosure.

FIG. 7 is a schematic block diagram of a terminal device 700 according to an implementation of the present disclosure. As shown in FIG. 7, the terminal device 700 is registered in both a first network and a second network. The terminal device 700 includes a receiving unit 710.

The receiving unit 710 is configured to receive first configuration information transmitted by a first device, the first configuration information is used for indicating the terminal device to receive a downlink message transmitted by a first network device or transmit an uplink message to the first network device within a first time period, the first network device is a network device under the first network.

The receiving unit 710 is further configured to receive the downlink message transmitted by the first network device or transmit the uplink message to the first network device according to the first configuration information.

Optionally, the receiving unit 710 is further configured to receive second configuration information transmitted by the first device, the second configuration information is used for indicating the terminal device to receive the downlink message transmitted by the second network device or transmit the uplink message to the second network device within a second time period, or the second configuration information is used for indicating the terminal device to receive the downlink message transmitted by the second network device or transmit the uplink message to the second network device after an end of a third time period.

The receiving unit 710 is specifically configured to: receive the downlink message transmitted by the first network device or transmitting the uplink message to the first network device, or receive the downlink message transmitted by the second network device or transmitting the uplink message to the second network device, according to the first configuration information and/or the second configuration information.

Optionally, before the receiving unit 710 receives the first configuration information transmitted by the first device, the terminal device 700 further includes a transmitting unit 720.

The transmitting unit 720 is configured to send a request message to the first device, the request message is used for requesting the first device to configure a fourth time period for the second network, wherein the terminal device receives the downlink message transmitted by the second network device and/or transmits the uplink message to the second network device within the fourth time period, or the second network device avoids paging the terminal device within the fourth time period.

Optionally, before the receiving unit 710 receives the first configuration information transmitted by the first device, the receiving unit 710 is further configured to receive the downlink message transmitted by the first network device or transmit the uplink message to the first network device.

Optionally, the downlink message is a paging message, and the uplink message is at least one of uplink data, a paging response, and location update information.

Optionally, the first device is the first network device or the second network device.

Optionally, the terminal device 700 only supports uplink transmission or downlink reception in a single network.

Optionally, the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

It should be understood that the above-mentioned and other operations and/or functions of various modules in the terminal device 700 according to the implementation of the present disclosure are respectively in order to realize the corresponding processes of the terminal device in the method 400 in FIG. 4, and are not repeated here for the sake of brevity.

Figure 8:
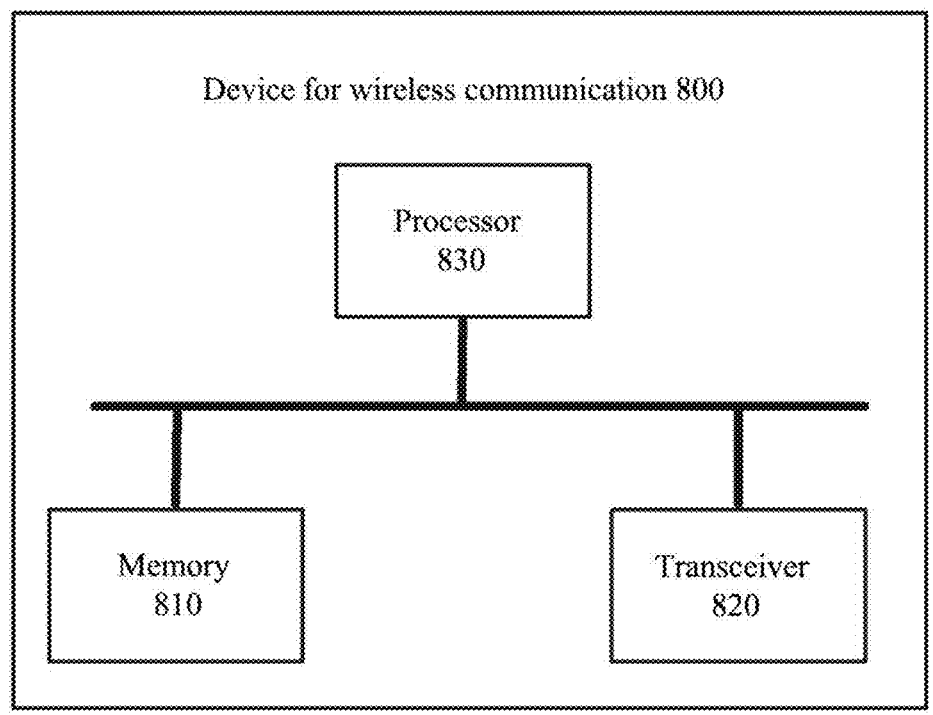
FIG. 8 shows a schematic block diagram of a device for wireless communication according to an implementation of the present disclosure.

FIG. 8 shows a schematic block diagram of a device 800 for wireless communication provided by an implementation of the present disclosure, the device 800 includes a memory 810, a transceiver 820, and a processor 830.

The memory 810 is configured to store a program including codes.

The transceiver 820 is configured to communicate with other devices.

The processor 830 is configured to execute program code in the memory 810.

Optionally, the transceiver 820 is configured to perform specific transmission and reception of signals under driving of the processor 830.

Optionally, when the codes are executed, the processor 830 may implement various operations performed by the first network terminal device in the method 200 in FIG. 2 or performed by the second network terminal device in the method 300 in FIG. 3, and will not be described in detail herein for the sake of brevity. At this time, the device 800 may be an access network device (e.g., gNB) or a core network device (e.g., AMF).

Optionally, when the codes are executed, the processor 830 may implement various operations performed by the terminal device in the method 400 in FIG. 4, which will not be repeated here for brevity. At this time, the device 800 may be a terminal device (e.g., a cell phone).

It should be understood that in the implementation of the present disclosure, the processor 830 may be a Central Processing Unit (CPU), or the processor 830 may be another general purpose processor, a digital signal processor (DSP), an application specific integrated circuit (ASIC), a Field programmable gate array (FPGA) or another programmable logic device, a discrete gate or a transistor logic device, a discrete hardware component, etc. The general purpose processor may be a microprocessor, or the processor may be any conventional processor or the like.

The memory 810 may include a read-only memory and a random access memory, and provide instructions and data to the processor 830. A portion of the memory 810 may include non-transitory random access memory. For example, the memory 810 may store information of a device type.

The transceiver 820 may be configured to implement signal transmission and reception functions, such as frequency modulation and demodulation functions, or up-conversion and down-conversion functions.

In implementation processes, at least one act of the method may be completed by an integrated logic circuit of hardware in the processor 830, or the integrated logic circuit may complete the at least one act under the driving of instructions in a form of software. Therefore, the device 800 for wireless communication may be a chip or chipset. The acts of the method disclosed in connection with the implementation of the present disclosure may be directly embodied to be completed by an execution of a hardware processor or by a combination of hardware and software modules in a processor. The software modules may be located in a storage medium commonly used in the art, such as a random access memory, flash memory, read-only memory, programmable read-only memory or electrically erasable programmable memory, or register. The storage medium is located in the memory, and the processor 830 reads the information in the memory and accomplishes the acts of the method with its hardware. In order to avoid repetition, it will not be described in detail here.

Figure 9:
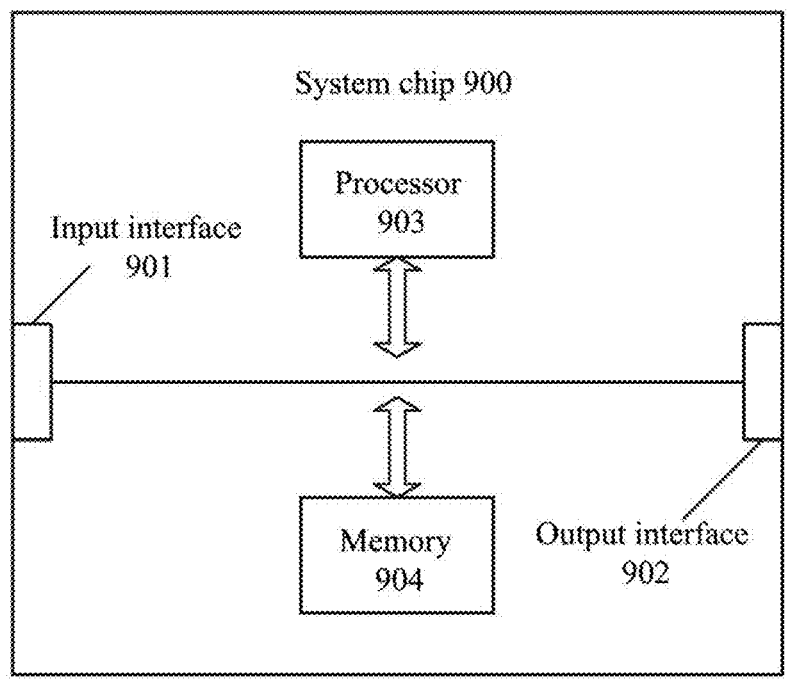
FIG. 9 is a schematic diagram of a structure of a system chip according to an implementation of the present disclosure.

FIG. 9 is a schematic diagram of a structure of a system chip 900 according to an implementation of the present disclosure. The system chip 900 of FIG. 9 includes an input interface 901, an output interface 902, a processor 903, and a memory 904, and the processor 903 and the memory 904 may be connected through internal communication connection lines, and the processor 1503 is used for executing codes in the memory 1504.

Optionally, when the codes are executed, the processor 903 implements the method executed by the terminal device in the method implementation. For the sake of conciseness, it will not be repeated here.

Optionally, when the codes are executed, the processor 903 implements the method executed by the first network device or the second network device in the method implementation. For the sake of conciseness, it will not be repeated here.

The implementations may be implemented in whole or in part by software, hardware, firmware, or any combination thereof. When the functions described in the implementations of the present disclosure are implemented through software, these functions may be implemented in whole or in parts in the form of a computer program product. The computer program product includes one or more computer instructions. When the computer program instructions are loaded and executed on a computer, the processes or functions described in the implementations of the present disclosure are generated in whole or in part. The computer may be a general purpose computer, a special purpose computer, a computer network, or other programmable apparatus. The computer instructions may be stored in a computer-readable storage medium or transmitted from one computer-readable storage medium to another, for example, the computer instructions may be transmitted from one website site, computer, server or data center to another website site, computer, server or data center by a wired (e.g., coaxial cable, optical fiber, digital subscriber line (DSL)) or wireless (e.g., infrared, wireless, microwave and the like) manner. The computer-readable storage medium may be any available medium that a computer may access or a data storage device such as a server, a data center, or the like that integrates one or more available medium. The available medium may be a magnetic medium (e.g., floppy disk, hard disk, magnetic tape), an optical medium (e.g., DVD), or a semiconductor medium (e.g., Solid State Disk (SSD)) or the like.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Those skilled in the art may clearly understand that for convenience and conciseness of description, the specific working processes of the systems, apparatuses and units described above may refer to the corresponding processes in the aforementioned method implementations and will not be described here.

What are described above are merely specific implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the scope of protection of the present disclosure shall be subject to that of the claims.

The invention claimed is:

1. A method for wireless communication of a dual-registered terminal device, wherein the terminal device is registered in a first network and a second network simultaneously and only supports single transmission, comprising:
receiving, by the terminal device, first configuration information transmitted by a first device, wherein the first configuration information is used for indicating to receive a downlink message transmitted by a first network device or transmitting an uplink message to the first network device within a first time period, and the first network device is a network device under the first network;
receiving, by the terminal device, the downlink message transmitted by the first network device or transmitting the uplink message to the first network device according to the first configuration information; and
before the terminal device receives the first configuration information transmitted by the first device, transmitting, by the terminal device, a request message to the first device, wherein the request message is used for requesting the first device to configure a fourth time period for the second network, and a second network device avoids paging the terminal device within the fourth time period.

2. The method of claim 1, the method further comprising:
receiving, by the terminal device, second configuration information transmitted by the first device, the second configuration information is used for indicating to receive a downlink message transmitted by a second network device or transmitting an uplink message to the second network device within a second time period, or the second configuration information is used for indicating to receive a downlink message transmitted by a second network device or transmitting an uplink message to the second network device after an end of a third time period; and
receiving, by the terminal device, the downlink message transmitted by the first network device or transmitting the uplink message to the first network device, or receiving the downlink message transmitted by the second network device or transmitting the uplink message to the second network device, according to the first configuration information or the second configuration information.

3. The method of claim 1, wherein the method further comprises:
before the terminal device receives the first configuration information transmitted by the first device,
receiving, by the terminal device, the downlink message transmitted by the first network device or transmitting the uplink message to the first network device.

4. The method of claim 1, wherein the downlink message is a paging message, and the uplink message is at least one of uplink data, a paging response, and location update information.

5. The method of claim 1, wherein the first device is the first network device or a second network device.

6. The method of claim 1, wherein the terminal device only supports uplink transmission and downlink reception in a single network.

7. A network device, wherein the network device communicates with a terminal device, and the terminal device is registered in a first network and a second network simultaneously and only supports single transmission, the network device comprises:
a communication interface, configured to transmit indication information to a second network device, wherein the indication information is used for indicating a first network device to transmit a downlink message to the terminal device or receive an uplink message from the terminal device, the first network device is a network device under the first network, and the second network device is a network device under the second network,
wherein the communication interface is further configured to receive a request message transmitted by the terminal device, the request message is used for requesting the first network device to configure a second time period for the second network, wherein the second network device avoids paging the terminal device within the second time period.

8. The network device of claim 7, wherein the indication information is further used for indicating that the second network device being able to page the terminal device within a first time period.

9. The network device of claim 7, wherein the communication interface is further configured to transmit configuration information to the terminal device, the configuration information is used for indicating the terminal device to receive a downlink message transmitted by the second network device or transmit an uplink message to the second network device within a third time period, or the configuration information is used for indicating the terminal device to receive a downlink message transmitted by the second network device or transmit an uplink message to the second network device after an end of a fourth time period.

10. The network device of claim 7, wherein the downlink message is a paging message, and the uplink message is at least one of uplink data, a paging response, and location update information.

11. The network device of claim 7, wherein the terminal device only supports uplink transmission and downlink reception in a single network.

12. A terminal device, wherein the terminal device is registered in a first network and a second network simultaneously and only supports single transmission, the terminal device comprises:
a communication interface, configured to receive first configuration information transmitted by a first device, wherein the first configuration information is used for indicating to receive a downlink message transmitted by a first network device or transmitting an uplink message to the first network device within a first time period, and the first network device is a network device under the first network;
wherein the communication interface is further configured to receive the downlink message transmitted by the first network device or transmit the uplink message to the first network device according to the first configuration information; and
wherein before the communication interface receives the first configuration information transmitted by the first device, the communication interface is further configured to transmit a request message to the first device, wherein the request message is used for requesting the first device to configure a fourth time period for the second network, wherein a second network device avoids paging the terminal device within the fourth time period.

13. The terminal device of claim 12, wherein the communication interface is further configured to receive second configuration information transmitted by the first device, the second configuration information is used for indicating to receive a downlink message transmitted by a second network device or transmitting an uplink message to the second network device within a second time period, or the second configuration information is used for indicating to receive a downlink message transmitted by a second network device or transmitting an uplink message to the second network device after an end of a third time period;
the communication interface is specifically configured to:
receive the downlink message transmitted by the first network device or transmit the uplink message to the first network device, or receive the downlink message transmitted by the second network device or transmit the uplink message to the second network device, according to the first configuration information or the second configuration information.

14. The terminal device of claim 12, wherein before the communication interface receives the first configuration information transmitted by the first device, the communication interface is further configured to receive the downlink message sent by the first network device or transmit the uplink message to the first network device.

15. The terminal device of claim 12, wherein the downlink message is a paging message, and the uplink message is at least one of uplink data, a paging response, and location update information.

16. The terminal device of claim 12, wherein if the first device is the first network device or a second network device.

17. The terminal device of claim 12, wherein the first network is a long-term evolution (LTE) network and the second network is a new radio (NR) network, or the first network is a NR network and the second network is a LTE network, or the first network is a NR network and the second network is a NR network, or the first network is a LTE network and the second network is a LTE network.

* * * * *